June 9, 1925.

A. B. TOMLINSON

PITCHFORK ATTACHMENT

Filed June 29, 1923

1,541,671

A. B. Tomlinson
INVENTOR

BY Victor J. Evans
ATTORNEY

WITNESS:

Patented June 9, 1925.

1,541,671

UNITED STATES PATENT OFFICE.

ARTHUR B. TOMLINSON, OF PORTAGE, WISCONSIN.

PITCHFORK ATTACHMENT.

Application filed June 29, 1923. Serial No. 648,551.

*To all whom it may concern:*

Be it known that I, ARTHUR B. TOMLINSON, a citizen of the United States, residing at Portage, in the county of Columbia and State of Wisconsin, have invented new and useful Improvements in Pitchfork Attachments, of which the following is a specification.

This invention relates to pitch forks and has for its object the provision of a novel attachment whereby to cut the twine used for binding shocks of corn, fodder or the like in a simple, expeditious and convenient manner.

It is well known in the art that when taking shocks of corn from the field it is first necessary to sever the twine by which they are bound, and the same thing occurs in the feed lot when feeding the bundles to the stock. Ordinarily this is done by hand simply by jerking violently upon the twine an act which is extremely uncomfortable to the hand and injurious to the fodder. It is with these facts in view that I have designed the present invention which contemplates the provision of a knife provided with means for clamping it upon the heel of a pitch fork the knife operating to cut the twine by inserting the outside tine of the fork under the twine and by an upward movement of the fork thus bringing the edge of the knife in contact with the twine severing it instantly.

An additional object is the provision of an attachment of this character which will be simple and inexpensive to make, easy to apply, positive in action, efficient and durable in service and a general improvement in the art.

With the above and other objects and advantages in view the invention consists in the details of construction to be hereinafter more fully described and claimed and illustrated in the accompanying drawings, in which:

Figure 1:
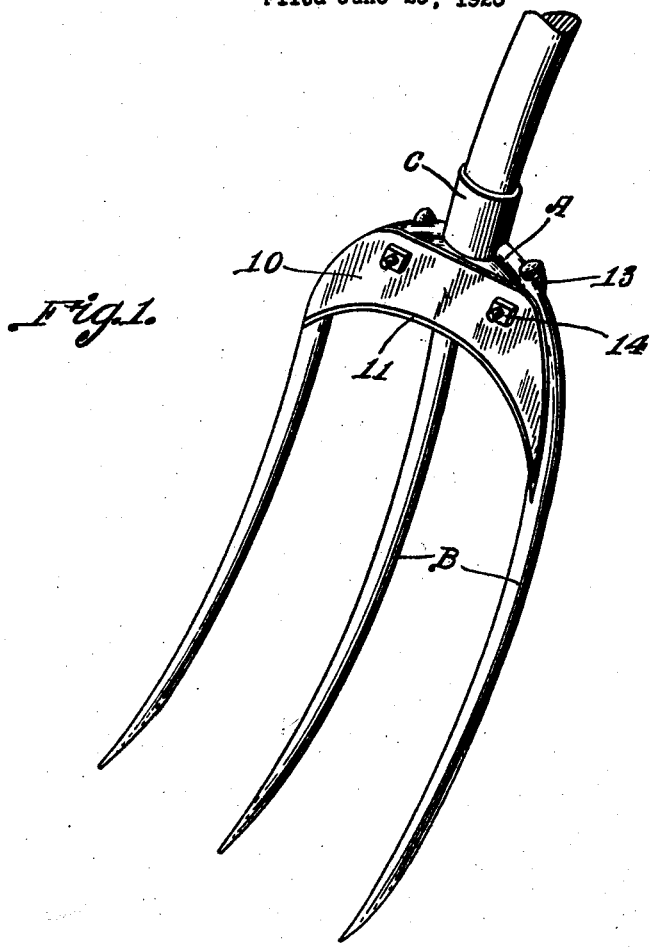
Figure 1 is a perspective view of a pitch fork with my attachment applied.
Figure 2:
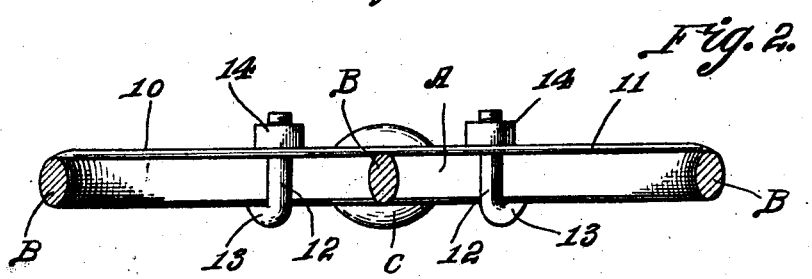
Figure 2 is a detail cross section.

Referring more particularly to the drawings the letter A designates the heel of a pitch fork, from which heel project the tines B and the socket C for the handle. In carrying out my invention I provide a substantially crescent shaped blade 10 adapted to be disposed upon the concaved side of the pitch fork at the heel or head thereof, the contour of the blade conforming, preferably, to the shape of the fork so as not to project therebeyond for catching in anything. The active edge of this blade, that is the edge toward the ends of the tines is concaved as shown at 11 and sharpened to knife edge. It is of course essential that clamping means be provided for holding this blade in place and in accomplishing this I make use of a pair of hook bolts 12 which are passed through the blade and which have their hook ends 13 engaging about the outermost tines. The other ends of these bolts are of course threaded and carry nuts 14.

In the use of the device it will be seen that to sever the binding twine on a bundle of corn or the like it is merely necessary to insert the outside tine of fork under the twine and by an upward thrust of the fork bringing the edge 11 of the blade in contact with the twine severing it.

From the foregoing description and a study of the drawings it will be apparent that I have thus provided a simply constructed and consequently inexpensive and easily applied knife attachment for pitch forks which will be a great convenience as well as a time and labor saver. The construction and mounting of the attachment is such that it will not be at all dangerous to the operator.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A knife attachment for a pitch fork, comprising a blade disposable upon the head portion of a fork and having its edge toward the ends of the tines sharpened, and means for clamping the blade upon the head, said means including a plurality of hook bolts passed through the blade with their hooked ends engaging the outermost tines of the fork and with their other ends carrying clamping nuts.

2. A knife attachment for pitchforks comprising a substantially crescent shaped blade disposed against the concaved side of a pitchfork with its convexed edges registering with the outer tines of the pitchfork, J-bolts passing through blades and having their end portions hooking about the outer tines, and a nut on each of said bolts.

3. A knife attachment for pitchforks comprising a blade adapted for disposition against the concaved side of a pitchfork at the juncture of the tines with the handle portions thereof, said blade having its outer or rear edge convexed and registering with the outer tines so as to be flush with the outermost portions thereof and the opposite edge of the blade being concaved and curved throughout.

In testimony whereof I affix my signature.

ARTHUR B. TOMLINSON.